(12) United States Patent
Dhong et al.

(10) Patent No.: US 6,927,615 B2
(45) Date of Patent: Aug. 9, 2005

(54) LOW SKEW, POWER EFFICIENT LOCAL CLOCK SIGNAL GENERATION SYSTEM

(75) Inventors: Sang Hoo Dhong, Austin, TX (US); Joel Abraham Silberman, Somers, NY (US); Osamu Takahashi, Round Rock, TX (US); James Douglas Warnock, Somers, NY (US); Dieter Wendel, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 10/455,178

(22) Filed: Jun. 5, 2003

(65) Prior Publication Data

US 2004/0246037 A1 Dec. 9, 2004

(51) Int. Cl.[7] ............................................. H03K 3/00
(52) U.S. Cl. ...................................... 327/291; 327/295
(58) Field of Search ................................ 327/291, 293, 327/295

(56) References Cited

U.S. PATENT DOCUMENTS

| | | | | |
|---|---|---|---|---|
| 3,792,362 A | * | 2/1974 | Grant | 327/176 |
| 5,553,276 A | * | 9/1996 | Dean | 713/500 |
| 5,751,665 A | * | 5/1998 | Tanoi | 368/120 |
| 6,069,510 A | * | 5/2000 | Keeth | 327/170 |
| 6,072,348 A | * | 6/2000 | New et al. | 327/295 |
| 6,114,884 A | * | 9/2000 | Kaplinsky | 327/108 |
| 6,348,824 B1 | * | 2/2002 | Grondalski et al. | 327/201 |

* cited by examiner

Primary Examiner—Terry D. Cunningham
Assistant Examiner—An T. Luu
(74) Attorney, Agent, or Firm—Carr LLP; Diana R. Gerhardt

(57) ABSTRACT

A local clock signal generation system is disclosed including multiple local clock buffers each receiving a global clock signal and producing a version of one or more local clock signals derived from the global clock signal. Each local clock buffer includes an input section and an output section. The input sections are substantially identical such that timing differences between the versions of the one or more local clock signals are reduced. An electronic circuit is described including the local clock signal generation system and a latch (e.g., a master latch of a flip-flop). A local clock buffer produces a gating signal and a local clock signal received by the latch. When the gating signal is a certain logic value, the local clock signal is a steady logic value, and the latch produces an input data signal as an output signal. An integrated circuit including the electronic circuit is disclosed.

20 Claims, 12 Drawing Sheets

INTRA-ELEMENT TIMING:

CLKAX-CLKBX SKEW = CLKAX SKEW + CLKBX SKEW

INTER-ELEMENT TIMING:

CLKB1-CLKA2 SKEW = CLKB1 SKEW + CLKA2 SKEW

INTER-ELEMENT TIMING:

CLKC1-CLKA1 SKEW = CLKC1 SKEW + CLKA1 SKEW

LOW SKEW, POWER EFFICIENT LOCAL CLOCK SIGNAL GENERATION SYSTEM

TECHNICAL FIELD

This invention relates generally to electronic circuits and, more particularly, to generation and distribution of synchronizing clock signals within electronic circuits.

BACKGROUND OF THE INVENTION

Many complex digital logic circuits, including processors, employ a technique called "pipelining" to perform more operations per unit of time (i.e., to increase throughput). Pipelining involves dividing a process into sequential steps, and performing the steps sequentially in independent stages. For example, if a process can be performed via n sequential steps, a pipeline to perform the process may include n separate stages, each performing a different step of the process. Since all n stages can operate concurrently, the pipelined process can potentially operate at n times the rate of the non-pipelined process.

Hardware pipelining involves partitioning a sequential process into stages, and adding storage elements (i.e., groups of latches or flip-flops, commonly called registers) between stages to hold intermediate results. In a typical hardware pipeline, combinational logic within each stage performs logic functions upon input signals received from a previous stage, and the storage elements positioned between the combinational logic of each stage are responsive to one or more synchronizing clock signals. The one or more clock signals control the movement of data within the pipeline.

Within an integrated circuit, a single global clock signal often provides a timing reference for the movement of data. FIGS. 1 and 2 will now be used to describe a timing problem inherent in known systems that distribute a global clock signal across a surface of an integrated circuit, and use local clock buffers located at different points on the surface to generate local clock signals derived from the global clock signal.

FIG. 1 is a diagram of an integrated circuit 100 including a global clock distribution system 102, a first local clock buffer (LCB) 104, and a second local clock buffer (LCB) 106. The global clock distribution system 102 is used to distribute a global clock signal across a surface of the integrated circuit 100. As indicated in FIG. 1, the local clock buffer (LCB) 104 and the local clock buffer (LCB) 106 are located at different points on the surface, and use the global clock signal to generate a first local clock signal "CLKA" and a second local clock signal "CLKB."

In general, the local clock signals CLKA and CLKB are used to synchronize the operations of various logic structures (e.g., gates, latches, registers, and the like) of logic circuitry of the integrated circuit 100. The local clock signals CLKA and CLKB may, for example, be the two different "phases" of a two-phase clocking scheme. As is common, the two-phase clocking scheme may be used to control the operations of master-slave latch pairs positioned between the combinational logic of each pipeline stage. Such master-slave latch pairs form flip-flops. One of the local clock signals CLKA and CLKB may be provided to control inputs of the master latches of the flip-flops, and the other one of the local clock signals CLKA and CLKB may be provided to control inputs of the slave latches of the flip-flops.

As indicated in FIG. 1, the local clock buffer (LCB) 104 uses the global clock signal to generate a local clock signal "CLKA1," one version of the local clock signal CLKA, and a local clock signal "CLKB1," one version of the local clock signal CLKB. The local clock buffer (LCB) 106 uses the global clock signal to generate a local clock signal "CLKA2," another version of the local clock signal CLKA, and a local clock signal "CLKB2," another version of the local clock signal CLKB.

FIG. 1 reflects the common situation where the internal structures of the local clock buffers (LCBs) 104 and 106 differ, and timing delays within the local clock buffers (LCBs) 104 and 106 also differ. As a result, common timing points for the local clock buffers (LCBs) 104 and 106 exist within the global clock distribution system 102 as indicated in FIG. 1.

FIG. 2 is a timing diagram illustrating timing relationships between the clock signals within the integrated circuit 100 of FIG. 1. As indicated in FIG. 2, a timing difference between the local clock signal CLKA1 generated by the local clock buffer (LCB) 104 and the local clock signal CLKA2 generated by the local clock buffer (LCB) 106 represents a "skew" of the local clock signal CLKA. A similar timing difference between the local clock signal CLKB1 generated by the local clock buffer (LCB) 104 and the local clock signal CLKB2 generated by the local clock buffer (LCB) 106 represents a "skew" of the local clock signal CLKB.

As the local clock signals CLKA and CLKB are used to synchronize the operations of logic structures, the skews of the local clock signals CLKA and CLKB may result in timing problems that cause the logic circuitry of the integrated circuit 100 to produce incorrect values. For example, as described above, the local clock signal CLKA may be provided to control inputs of master latches of flip-flops separating the combinational logic of pipeline stages, and the local clock signal CLKB may be provided to control inputs of slave latches of the flip-flops. The skews of the local clock signals CLKA and CLKB may reduce an amount of time a signal derived from an output of a first flip-flop positioned at a beginning of a pipeline stage has to propagate through the combinational logic of the stage and reach a second flip-flop positioned at an end of the pipeline stage. If a cycle time (i.e., period) of the global clock signal is not made long enough, the signal may not reach the second flip-flop before the master latch "captures" the value of the signal at the input, and the flip-flop may capture an incorrect value of the signal. As a result, the logic circuitry of the integrated circuit 100 may produce one or more incorrect values.

In general, use of the different local clock buffers (LCBs) 104 and 106 to produce the local clock signals CLKA and CLKB results in relatively large skews of the local clock signals CLKA and CLKB, causes a lower bound of the period of the global clock signal to be relatively high, and thereby reduces an upper bound of a maximum performance of the logic circuitry of the integrated circuit 100.

It would thus be advantageous to have a local clock signal generation system wherein timing differences between local clock signals (i.e., local clock signal "skews") are reduced.

SUMMARY OF THE INVENTION

A local clock signal generation system is disclosed including multiple local clock buffers each receiving a global clock signal and producing a version of one or more local clock signals derived from the global clock signal. Each of the local clock buffers includes an input section and an output section. The input sections of the local clock buffers are substantially identical such that timing differences between the versions of the one or more local clock signals are reduced.

An electronic circuit is described including the local clock signal generation system and a latch. The latch receives a local clock signal produced by one of the local clock buffers of the local clock signal generation system, and produces an input data signal as an output signal when the local clock signal is a steady logic value (e.g., a steady logic '1'). In one embodiment of the electronic circuit, the local clock buffer receives multiple control signals and produces a gating signal dependent upon the control signals. When the gating signal is a certain logic value (e.g., a logic '1'), the local clock signal is the steady logic value, and the latch produces the input data signal as the output signal. The latch may be, for example, a master latch of a master-slave flip-flop. An integrated circuit including the electronic circuit is disclosed.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 3:
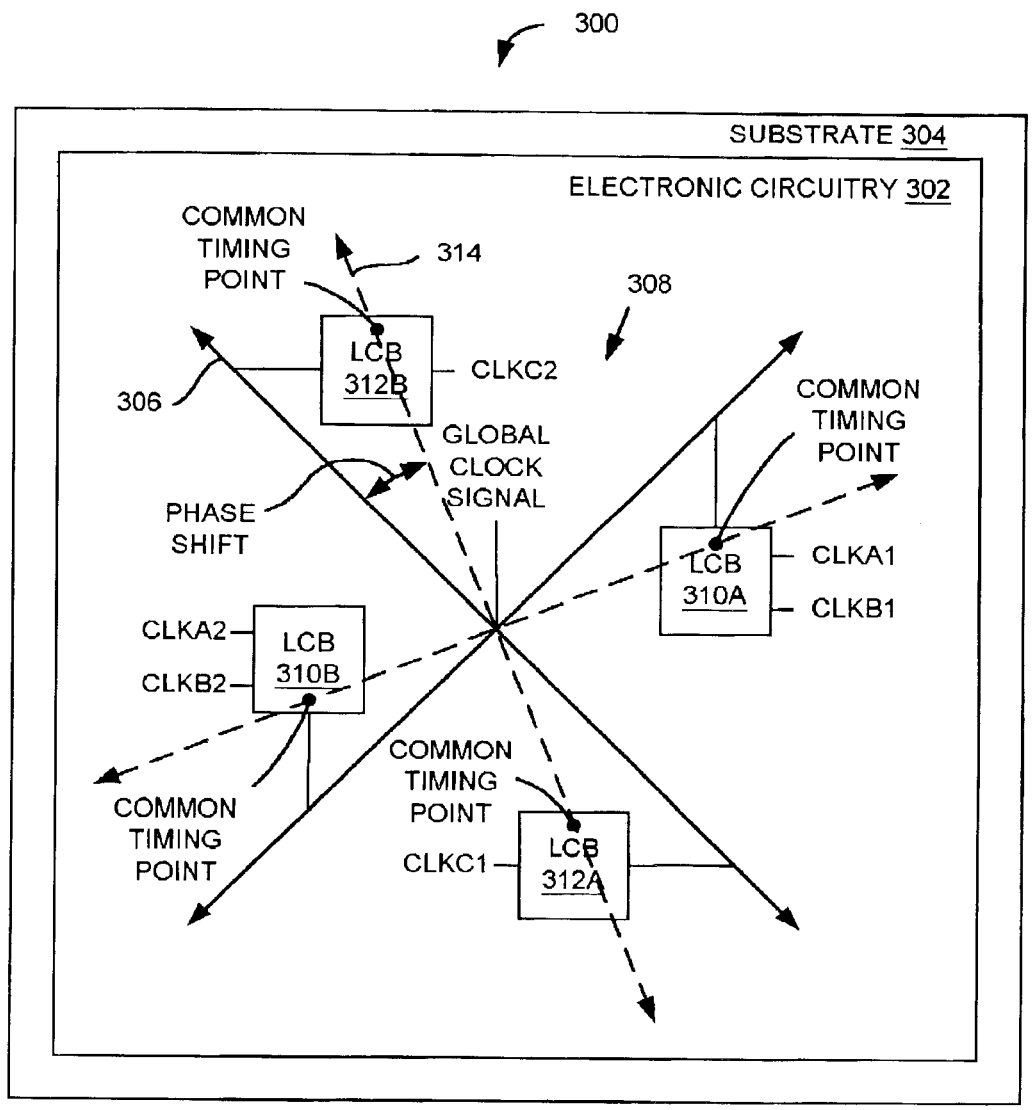
FIG. 3 is a diagram of one embodiment of an integrated circuit including electronic circuitry formed on and within a surface of a semiconductor substrate, wherein the electronic circuitry includes a global clock signal distribution system and a local clock signal generation system, and wherein the local clock signal generation system includes multiple local clock buffers (LCBs) producing local clock signals.

FIG. 3 is a diagram of one embodiment of an integrated circuit 300 including electronic circuitry 302 formed on and within a surface of a semiconductor substrate 304. The electronic circuitry 302 includes a global clock signal distribution system 306 and a local clock signal generation system 308. The global clock signal distribution system 306 is used to distribute a "GLOBAL CLOCK" signal within the electronic circuitry 302 and, in general, across the surface of the substrate 304. The global clock signal distribution system 306 may be any one of several known structures, including tree-based structures and grid-based structures, or any combination thereof.

The local clock signal generation system 308 includes multiple local clock buffers (LCBs) 310A, 310B, 312A, and 312B. Each of the local clock buffers (LCBs) 310A, 310B, 312A, and 312B receives the GLOBAL CLOCK signal via the global clock signal distribution system 306, and produces at least one local clock signal dependent upon the GLOBAL CLOCK signal.

As described in more detail below, each of the local clock buffers (LCBs) 310A, 310B, 312A, and 312B has an input section and an output section. The input sections of all of the multiple local clock buffers (LCBs) 310A, 310B, 312A, and 312B are substantially identical. The output sections of the local clock buffers (LCBs) 310A, 310B, 312A, and 312B differ in order to produce the different local clock signals (e.g., to support different latch types as described below). Further, output sections of local clock buffers (LCBs) that produce like local clock signals may be substantially identical, further reducing local clock signal skews. As a result, skews of the local clock signals produced by the local clock buffers (LCBs) 310A, 310B, 312A, and 312B are reduced.

As indicated in FIG. 3, each of the local clock buffers (LCBs) 310A, 310B, 312A, and 312B has a common timing point. As described below, the common timing point is positioned between the input section and the output section.

As the input sections of the local clock buffers (LCBs) 310A, 310B, 312A, and 312B are substantially identical, signals within the local clock buffers (LCBs) 310A, 310B, 312A, and 312B at the common timing points are substantially identical, and displaced in time from the GLOBAL CLOCK signal by a "phase shift."

This similar displacement in time is represented in FIG. 3 by a "virtual" global clock signal distribution system 314 that passes through the common timing points of the local clock buffers (LCBs) 310A, 310B, 312A, and 312B, and is displaced rotationally from the global clock signal distribution system 306 by an angle representing the phase shift. That is, the virtual global clock signal distribution system 314 and the global clock signal distribution system 306 are identical, and may be viewed as "pinned" at a central point. As indicated in FIG. 3, the virtual global clock signal distribution system 314 is rotated in the clockwise direction about the central point by the angle representing the phase shift with respect to the global clock signal distribution system 306.

As indicated in FIG. 3, the local clock buffers (LCB) 310A and 310B are located at different points on the surface of the substrate 304, and both use the GLOBAL CLOCK signal to generate a first local clock signal "CLKA" and a second local clock signal "CLKB." In general, and as described above, the local clock signals CLKA and CLKB are used to synchronize the operations of various logic structures (e.g., gates, registers, and the like) of logic circuitry of the electronic circuitry 302. The local clock signals CLKA and CLKB may, for example, be the two different "phases" of a two-phase clocking scheme. As is common, such two-phase clocking schemes are used to control operations of master-slave latch combinations forming flip-flops. That is, one of the local clock signals CLKA and CLKB may be provided to control inputs of the master latches of the flip-flops, and the other one of the local clock signals CLKA and CLKB may be provided to control inputs of the slave latches of the flip-flops.

The local clock buffer (LCB) 310A uses the GLOBAL CLOCK signal to generate a local clock signal "CLKA1," one version of the local clock signal CLKA, and a clock signal "CLKB1," one version of the local clock signal CLKB. The local clock buffer (LCB) 310B uses the GLOBAL CLOCK signal to generate a local clock signal "CLKA2," another version of the local clock signal CLKA, and a clock signal "CLKB2," another version of the local clock signal CLKB.

In the embodiment of FIG. 3, both the input sections and the output sections of the local clock buffers (LCBs) 310A and 310B are substantially identical. As a result, and as described in more detail below, skews of the local clock signals CLKA and CLKB produced by the local clock buffers (LCBs) 310A and 310B are reduced.

As indicated in FIG. 3, the local clock buffers (LCB) 312A and 312B are located at different points on the surface of the substrate 304, and both use the GLOBAL CLOCK signal to generate a local clock signal "CLKC." In one embodiment, the local clock signal CLKC is a pulse clock signal used to synchronize the operations of various logic structures (e.g., gates, registers, and the like) of the electronic circuitry 302. (See, for example, FIGS. 8 and 9A–9B). For example, as is common, such pulse clock signals are used to control the operations of latches (i.e., "pulsed clock" latches) that pass an input data signal when the pulse clock signal is active or asserted, store a value of the input data signal when the pulse clock signal transitions from active to inactive or deasserted, and produces the stored value of the input data signal when the pulse clock signal is inactive.

The local clock buffer (LCB) 312A uses the GLOBAL CLOCK signal to generate a local clock signal "CLKC1," one version of the local clock signal CLKC, and the local clock buffer (LCB) 312B uses the GLOBAL CLOCK signal to generate a local clock signal "CLKC2," another version of the local clock signal CLKC. In the embodiment of FIG. 3, both the input sections and the output sections of the local clock buffers (LCBs) 312A and 312B are substantially identical. As a result, and as described in more detail below, a skew of the local clock signal CLKC produced by the local clock buffers (LCBs) 312A and 312B is reduced.

Since the input sections of the local clock buffer (LCBs) 310 and 312 are substantially identical, skews between the local clock signals CLKA1, CLKB1, CLKA2, CLKB2, CLKC1, and CLKC2 produced by the local clock buffer (LCBs) 310 and 312 are reduced. Further, in embodiments of the local clock buffer (LCBs) 310 and 312 described below, gating of the GLOBAL CLOCK signal to produce the local clock signals occurs before common timing point, further reducing skews between the local clock signals.

Herein below, the local clock buffers (LCBs) 310A and 310B will be referred to collectively as the local clock buffers (LCBs) 310, and the local clock buffers (LCBs) 312A and 312B will be referred to collectively as the local clock buffers (LCBs) 312.

Figure 4A:
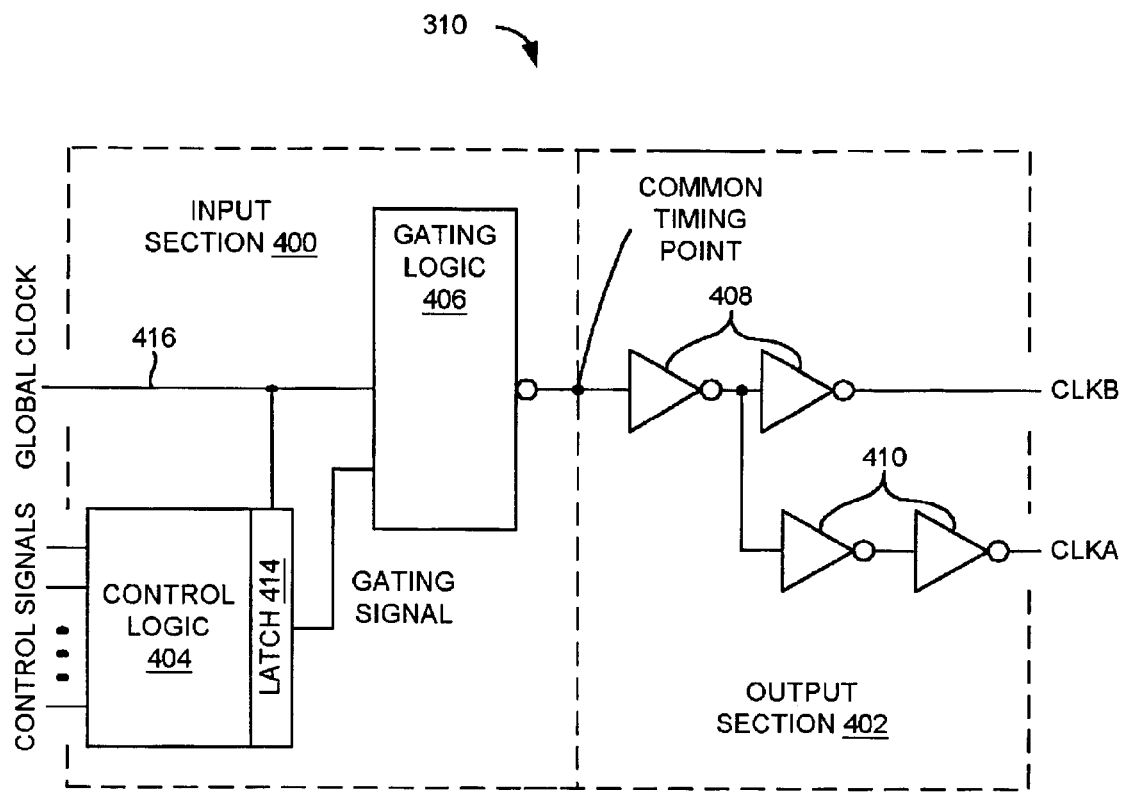
FIG. 4A is a diagram of one embodiment of a representative one of the local clock buffers (LCBs) of FIG. 3, wherein the representative local clock buffer (LCB) includes control logic and gating logic.

FIG. 4A is a diagram of one embodiment of a representative one of the local clock buffers (LCBs) 310 of FIG. 3. In the embodiment of FIG. 4A, the representative local clock buffer (LCB) 310 includes an input section 400 and an output section 402. The common timing point within the representative local clock buffer (LCB) 310 is located between the input section 400 and the output section 402.

As indicated in FIG. 4A, the input section 400 includes control logic 404 and gating logic 406. The control logic 404 receives multiple control signals and the GLOBAL CLOCK signal and produces a "GATING" signal at an output. A latch 414 at the output of the control logic 404 receives the GLOBAL CLOCK signal and produces the GATING signal. The latch 414 passes data at an input of the latch 414 to the output when the GLOBAL CLOCK signal is high, stores an input value when the GLOBAL CLOCK signal transitions from high to low, and produces the stored value at the output as the GATING signal when the GLOBAL CLOCK signal is low.

The gating logic 406 receives the GLOBAL CLOCK signal and GATING signal as inputs, and produces an intermediate clock signal at an output (i.e., at the common timing point). In the embodiment of FIG. 4A, the intermediate clock signal produced by the gating logic 406 at the common timing point is inverted with respect to the GLOBAL CLOCK signal. The inversion bubble at the output of the gating logic 406 indicates that in the embodiment of FIG. 4A, the gating logic 406 perform a logic inversion at an output.

The gating logic 406 may perform, for example, a NOR logic function upon the GLOBAL CLOCK signal and the GATING signal, thereby producing the intermediate clock signal at the common timing point. (See also FIG. 4C and the description of FIG. 4C below.) In this situation, when the GATING signal is a logic '0', the gating logic 406 produces a time-delayed and inverted version of the GLOBAL CLOCK signal as the intermediate clock signal at the common timing point. When the GATING signal is a logic '1', the gating logic 406 produces a steady logic '0' as the intermediate clock signal. In other embodiments, the intermediate clock signal produced by the gating logic 406 may not be inverted with respect to the GLOBAL CLOCK signal.

The output section 402 includes a first pair of inverters 408 coupled in series producing the local clock signal CLKB, and a second pair of inverters 410 coupled in series producing the local clock signal CLKA. A first inverter of the pair of inverters 408 receives and inverts the intermediate clock signal produced by the gating logic 406 of the input section 400. The second inverter of the pair of inverters 408 receives and inverts the output produced by the first inverter of the pair of inverters 408, thereby producing the local clock signal CLKB. As a result, the local clock signal CLKB is inverted with respect to the GLOBAL CLOCK signal (i.e., is out of phase with the GLOBAL CLOCK signal).

A first inverter of the pair of inverters 410 receives and inverts the signal produced by the first inverter of the pair of inverters 408. The second inverter of the pair of inverters 410 receives and inverts the output produced by the first inverter of the pair of inverters 410, thereby producing the local clock signal CLKA. As a result, the local clock signal CLKA is not inverted with respect to the GLOBAL CLOCK signal (i.e., is in phase with the GLOBAL CLOCK signal).

For example, where the representative local clock buffer (LCB) 310 represents the local clock buffer (LCB) 310A of FIG. 3, the first pair of inverters 408 produces the local clock signal CLKB1, and the second of the pair of inverters 410 produces the local clock signal CLKA1. On the other hand, where the representative local clock buffer (LCB) 310 represents the local clock buffer (LCB) 310B of FIG. 3, the first pair of inverters 408 produces the local clock signal CLKB2, and the second of the pair of inverters 410 produces the local clock signal CLKA2.

The control logic 404 preferably produces the GATING signal during a single cycle of the GLOBAL CLOCK signal, and the gating logic 406 preferably comprises a single gate (e.g., a NAND gate or a NOR gate). In this situation, the global clock is gated by a single gate, only 3 gate levels exist between the GLOBAL CLOCK signal and the local clock signal CLKB, and 4 gate levels exist between the GLOBAL CLOCK signal and the local clock signal CLKA. Further, 2 of the 3 gates between the GLOBAL CLOCK signal and the local clock signal CLKB are also in a path between the GLOBAL CLOCK signal and the local clock signal CLKA. As a result, the skew between the local clock signals is minimized.

Viewing the representative local clock buffer (LCB) 310 of FIG. 4A from an electrical power dissipation standpoint, it is noted that no switched structures (e.g., inverters or other gates) exist on a signal line 416 providing the GLOBAL CLOCK signal from the global clock distribution system 306 of FIG. 3 to control logic 404 and the gating logic 406 of the input section 400. Thus when the GLOBAL CLOCK signal is gated inactive (i.e., "off") by the gating logic 406, the electrical power dissipation of the representative local clock buffer (LCB) 310 is minimal. In addition, an input capacitance of the input section 400 is substantially fixed and predictable and can be reduced with careful design and manufacture. As a result, the electrical power dissipation of the electronic circuitry 302 of FIG. 3 including the representative local clock buffer (LCB) 310 of FIG. 4A can be substantially reduced.

Figure 4B:
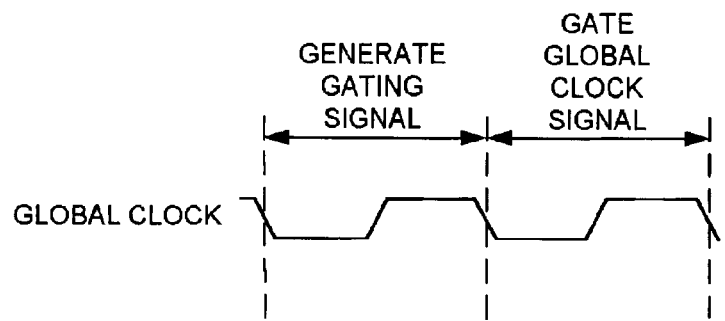
FIGS. 4B and 4C are timing diagrams depicting operation of the control logic and the gating logic of FIG. 4A.
Figure 4C:
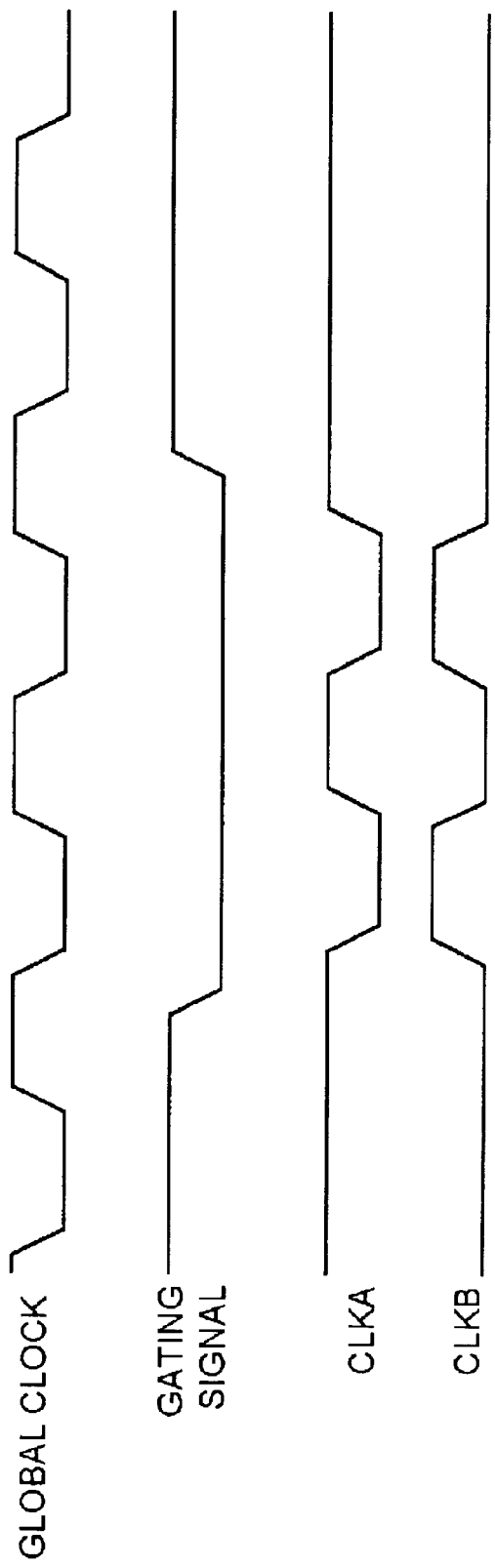

FIGS. 4B and 4C are timing diagrams depicting operation of the control logic 404 and the gating logic 406 of FIG. 4A.

As indicated in FIG. 4B, the latch 414 of the control logic 404 produces the GATING signal during one cycle of the GLOBAL CLOCK signal, and the gating logic 406 gates the GLOBAL CLOCK signal during the next cycle of the GLOBAL CLOCK signal.

FIG. 4C reflects the embodiment of the gating logic 406 described above wherein the gating logic 406 produces the intermediate clock signal by performing a NOR logic function on the GLOBAL CLOCK signal and GATING signal inputs. As described above, in the embodiment of FIG. 4A, when the GATING signal is a logic '0', the intermediate clock signal produced by the gating logic 406 is a time-delayed and inverted version of the GLOBAL CLOCK signal. As indicated in FIG. 4C, when the GATING signal is a logic '0', the local clock signal CLKA is a time-delayed version of the GLOBAL CLOCK signal, and the local clock signal CLKB is a time-delayed and inverted version of the GLOBAL CLOCK signal.

As described above, when the GATING signal is a logic '1', the gating logic 406 produces a steady logic '0' intermediate clock signal. As indicated in FIG. 4C, when the GATING signal is a logic '1', the local clock signal CLKA is a steady logic '1', and the local clock signal CLKB is a steady logic '0'.

The local clock signals CLKA and CLKB may, for example, be advantageously provided to control inputs of a master latch and a slave latch, respectively, forming a master-slave flip-flop. (See, for example, latches 602A and 602B shown in FIG. 6A and described below.) The master latch may pass data from a data input to an output when the local clock signal CLKA is high, store a value of the input data when the local clock signal CLKA transitions from high to low, and produce the stored data value at the output when the local clock signal CLKA is low. In this situation, and with the timing of FIG. 4C, when the GATING signal transitions from high to low, the local clock signal CLKA is a logic '1', and the master latch is passing data from the input to the output. Shortly thereafter, the local clock signal CLKA transitions from high to low, and the master latch "captures" the input data value and produces the stored data value at the output.

The slave latch may receive the output of the master latch at a data input, and may pass the data from the data input to an output when the local clock signal CLKB is high, store a value of the input data when the local clock signal CLKB transitions from high to low, and produce the stored data value at the output when the local clock signal CLKB is low. In this situation, and with the timing of FIG. 4C, when the GATING signal transitions from high to low, the local clock signal CLKB is a logic '0', and the slave latch produces stored data at the output. Shortly thereafter, the local clock signal CLKB transitions from low to high, and the slave latch starts passing data received from the master latch to the output, thereby "launching" the data value stored by the master latch.

Figure 5:
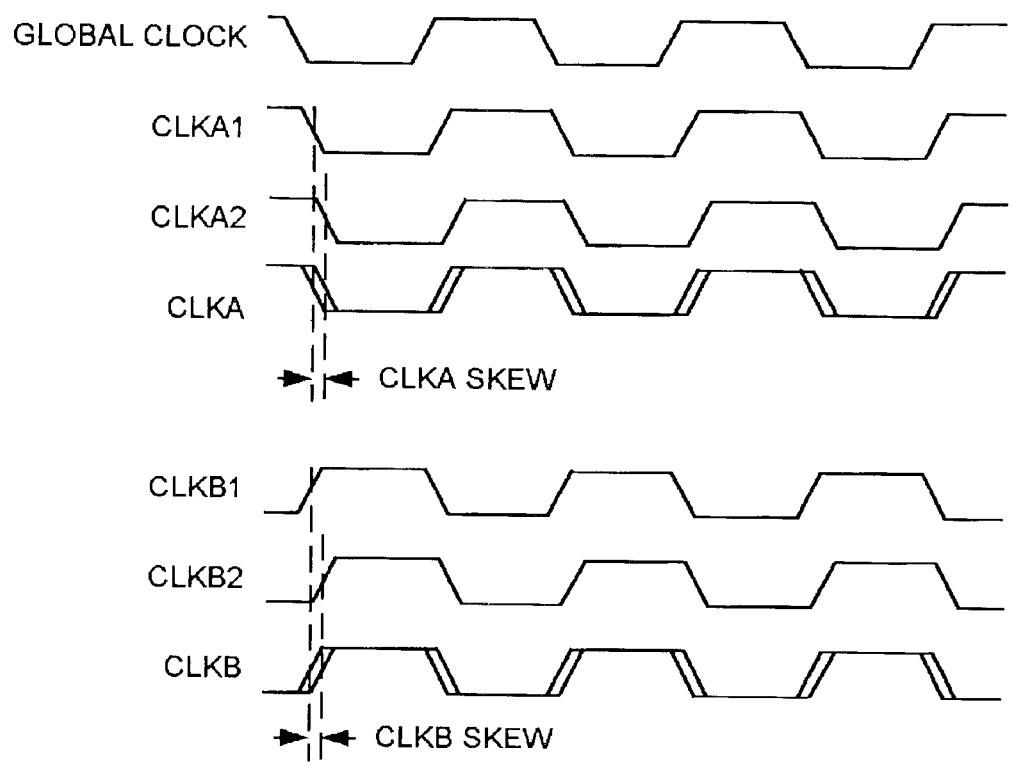
FIG. 5 is a timing diagram illustrating timing relationships between the local clock signals generated by the local clock buffers (LCBs) of FIG. 3.

FIG. 5 is a timing diagram illustrating timing relationships between the local clock signals generated by the local clock buffers (LCBs) 310A and 310B of FIG. 3. As indicated in FIG. 5, a timing difference between the local clock signal CLKA1 generated by the local clock buffer (LCB) 310A and the local clock signal CLKA2 generated by the local clock buffer (LCB) 310B represents a "skew" of the local clock signal CLKA.

Figure 1:
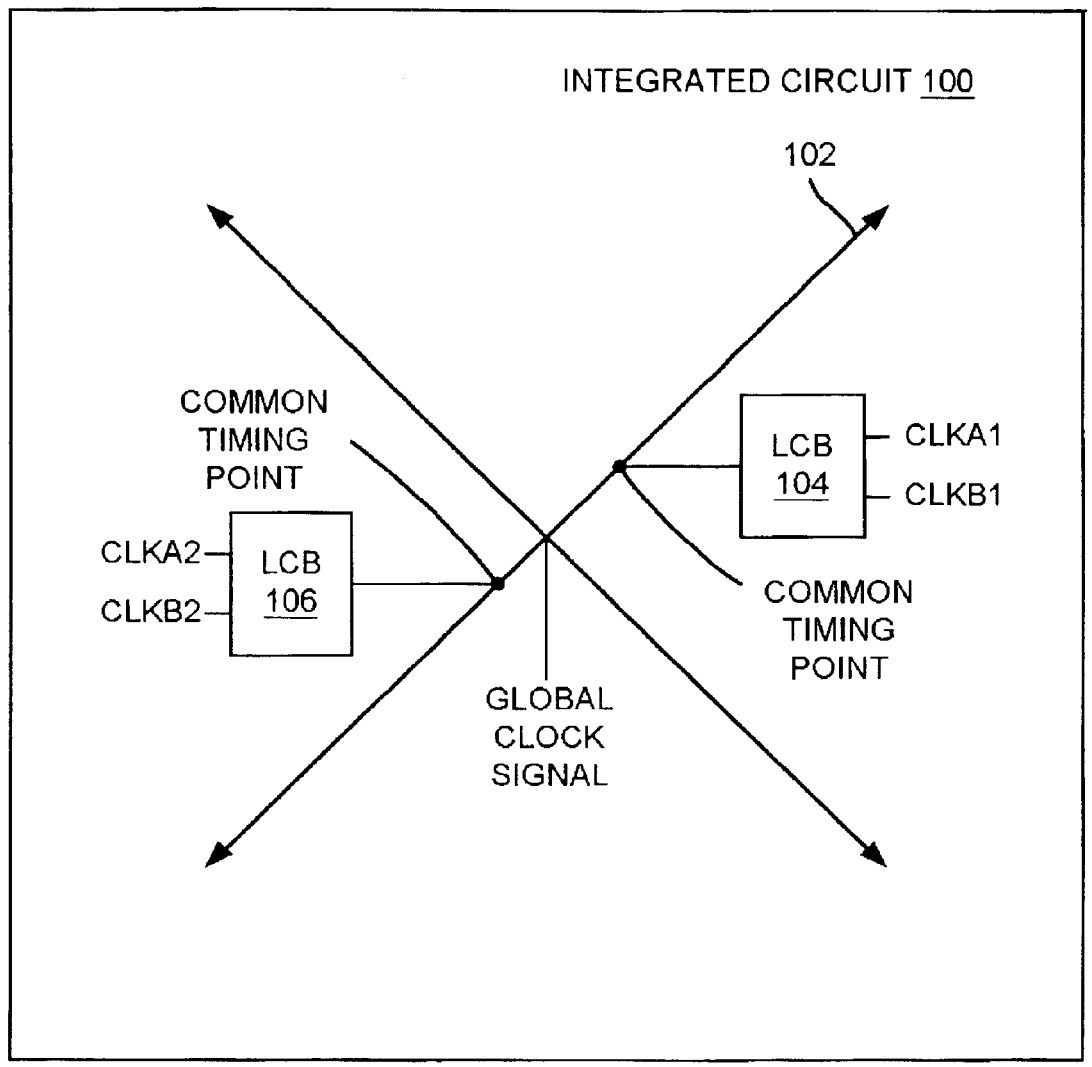
FIG. 1 is a diagram of an integrated circuit including a global clock distribution system, a first local clock buffer, and a second local clock buffer.
Figure 2:
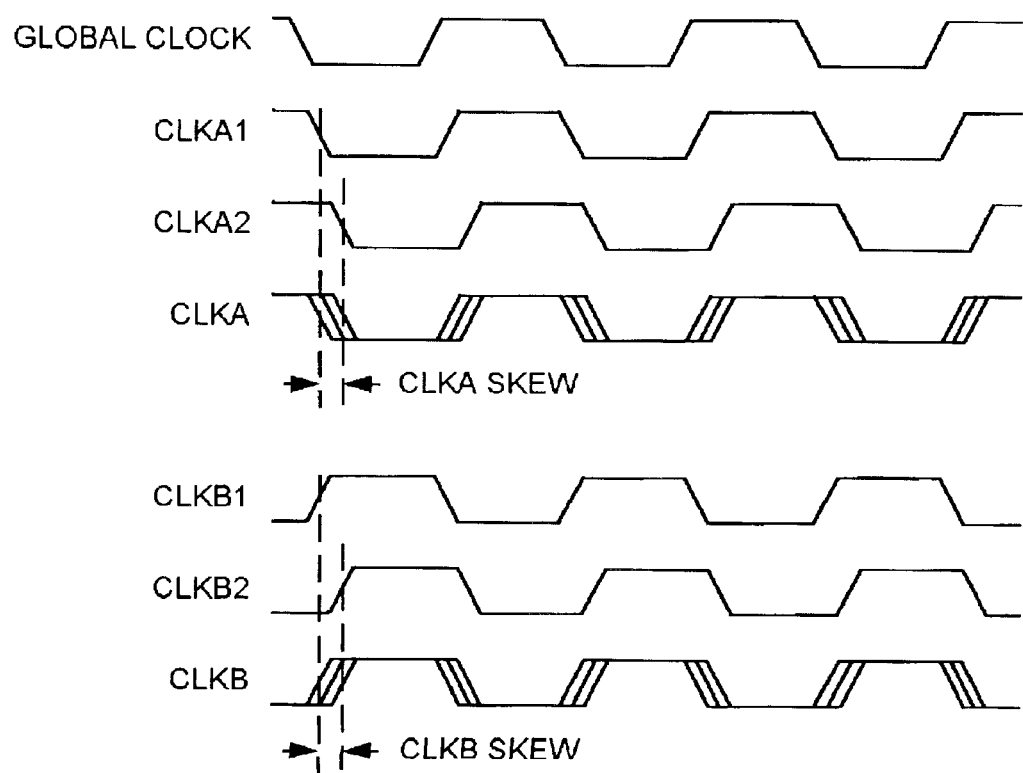
FIG. 2 is a timing diagram illustrating timing relationships between the clock signals within the integrated circuit of FIG. 1.

As both the input sections 400 and the output sections 402 of the local clock buffers (LCBs) 310A and 310B of FIG. 3 are substantially identical, the skews of the local clock signals CLKA and CLKB produced by the local clock buffers (LCBs) 310A and 310B are substantially reduced over those of FIGS. 1 and 2. In general, use of the substantially identical local clock buffers (LCBs) 310A and 310B to produce the local clock signals CLKA and CLKB allows the lower bound of the period of the GLOBAL CLOCK signal to be reduced, thereby increasing the upper bound of the maximum performance of the logic circuitry of the electronic circuitry 302.

Figure 6A:
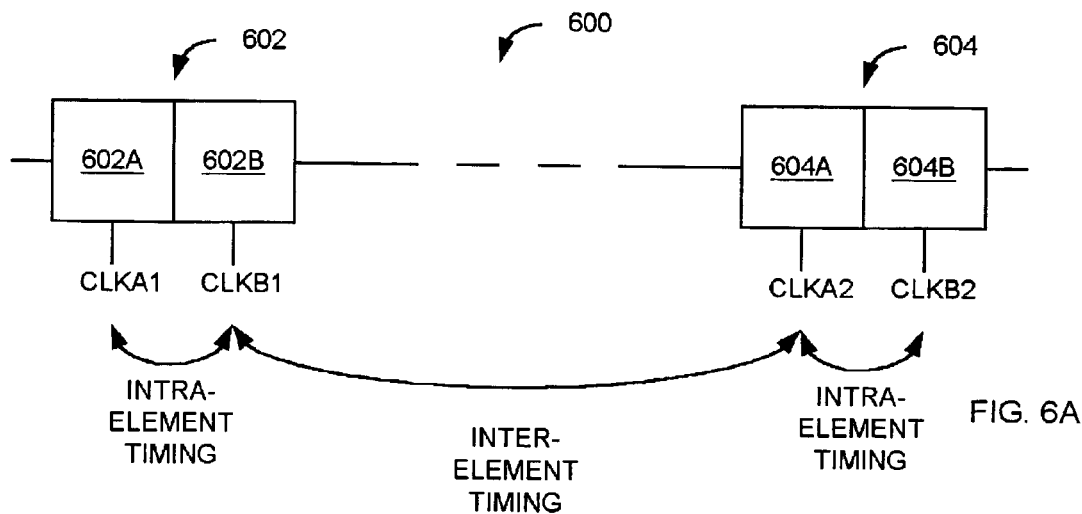
FIG. 6A is a diagram of a logic circuit wherein one storage element is coupled to receive a signal derived from an output of another storage element.

FIG. 6A is a diagram of a logic circuit 600 wherein a storage element 604 is coupled to receive a signal derived from an output of a storage element 602. The storage elements 602 and 604 each include a pair of latches, and may be, for example, master slave flip-flops.

Within the electronic circuitry 302 of FIG. 3, metal oxide semiconductor (MOS) devices are expectedly used to effect clock signal transitions. More specifically, p-channel MOS devices are expectedly used to effect rising edge transitions of the clock signals, and n-channel MOS devices are expectedly used to effect falling edge transitions of the clock signals. It is well known that the electron mobilities of n-channel MOS devices are about twice as great as those of p-channel MOS devices. As a result, smaller n-channel MOS devices generally produce faster signal transitions, and falling edge transitions of local clock signals tend to occur faster than rising edge transitions. For this reason, it is advantageous to make timing sensitive devices responsive to falling edges of clock signals.

For example, in FIG. 3, the global clock distribution system 306 used to distribute the GLOBAL CLOCK signal represents a very large (capacitive) electrical load. As falling edge transitions of the GLOBAL CLOCK signal expectedly occur faster than rising edge transitions, it is advantageous to make structures using the GLOBAL CLOCK signal as a timing reference (e.g., the local clock buffers 310 and 312) responsive to falling edge transitions of the GLOBAL CLOCK signal.

Similarly, the local clock buffers (LCBs) 310 and 312 are typically the largest electrical loads driven by the GLOBAL CLOCK signal. For the reasons described above, it is advantageous to make structures using the local clock signals produced by the local clock buffers (LCBs) 310 and 312 as timing references (e.g., latches and flip-flops) responsive to falling edge transitions of the local clock signals. This is especially true when true and complement versions of local clock signals are needed by circuit logic (e.g., dynamic gates, transmission gates, and the like) and must be generated by the local clock buffers (LCBs). Within such circuit logic, N-CHANNEL MOS transistors typically receive the true versions of the local clock signals, and P-CHANNEL MOS transistors typically receive the complement versions of the local clock signals.

Accordingly, a first (master) latch 602A of the storage element 602 receives the local clock signal CLKA1 at a control input. The latch 602A passes data from a data input to an output when the local clock signal CLKA1 is high, stores a value of the input data when the local clock signal CLKA1 transitions from high to low, and produces the stored data value at the output when the local clock signal CLKA1 is low. The latch 602A is said to "capture" the input data value when the local clock signal CLKA1 transitions from high to low.

A second (slave) latch 602B of the storage element 602 has a data input coupled to the output of the latch 602A, and receives the local clock signal CLKB1 at a control input. The first (master) latch 602A and the second (slave) latch 602B may form, for example, a master-slave flip-flop. The latch 602B passes data from the input to an output when the local clock signal CLKB1 is high, stores a value of the input data when the local clock signal CLKB1 transitions from high to low, and produces the stored data value at the output when the local clock signal CLKB1 is low. The latch 602B is said to "launch" the data value stored by the latch 602A when the local clock signal CLKB1 transitions from low to high.

A first (master) latch 604A of the storage element 604 receives the local clock signal CLKA2 at a control input, operates similar to the latch 602A of the storage element 602, and captures a value at a data input in response to falling edge transitions of the local clock signal CLKA2. A second (slave) latch 604B of the storage element 604 receives the local clock signal CLKB2 at a control input, operates similar to the latch 602B of the storage element 602, and launches the data value stored by the latch 604A in response to rising edge transitions of the local clock signal CLKB2. The first (master) latch 604A and the second (slave) latch 604B may form, for example, a master-slave flip-flop.

As indicated in FIG. 6A and described below, timing variations in the clock signal CLKAX (X=1 or 2) and the corresponding clock signal CLKBX affect intra-element timing, and timing variations in the local clock signal CLKB1 and the local clock signal CLKA2 affect inter-element timing.

Figure 6B:
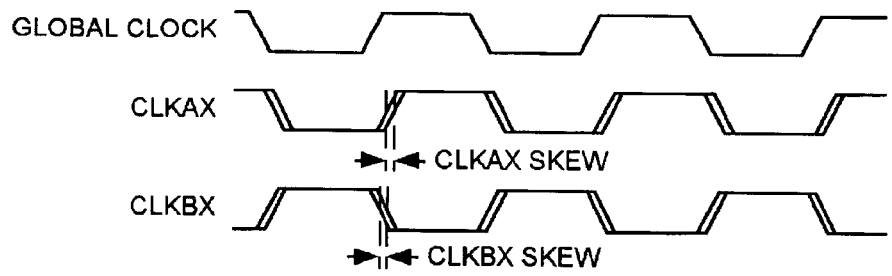
FIG. 6B is a timing diagram illustrating how variations in local clock signals affect intra-element timing in FIG. 6A.

FIG. 6B is a timing diagram illustrating how variations in the local clock signals CLKAX (X=1 or 2) and the local clock signals CLKBX affect the intra-element timing in FIG. 6A. As indicated in FIG. 6B, a "CLKAX–CLKBX skew" affecting the intra-element timing is equal to the sum of a timing variation or skew in the local clock signals CLKAX (i.e., a CLKAX skew) and a timing variation or skew in the corresponding clock signals CLKBX (i.e., a CLKBX skew).

It is noted that there must be sufficient time between rising edge transitions of the local clock signal CLKA1/CLKA2 and falling edge transitions of the local clock signal CLKB1/CLKB2 to prevent mid-cycle race conditions wherein data passes through both the master and slave latches.

Figure 6C:
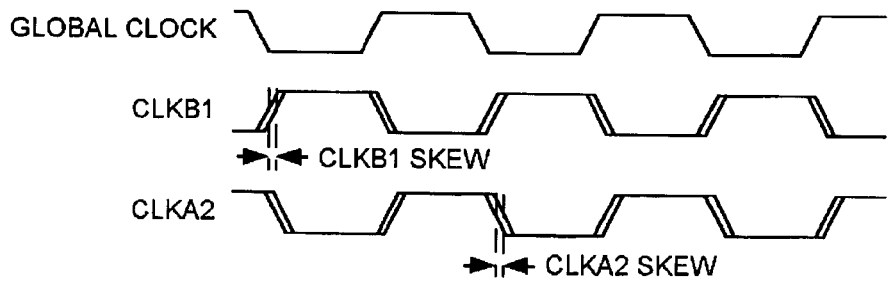
FIG. 6C is a timing diagram illustrating how variations in local clock signals affect inter-element timing of FIG. 6A.

FIG. 6C is a timing diagram illustrating how variations in the local clock signal CLKB1 and the local clock signal CLKA2 affect the inter-element timing of FIG. 6A. As indicated in FIG. 6C, a "CLKB1–CLKA2 skew" affecting the inter-element timing is equal to the sum of a timing variation or skew in the local clock signal CLKB1 and a timing variation or skew in the local clock signal CLKA2.

It is noted that skew between the local clock signals CLKB1 and CLKA2 requires a certain amount of logic to be positioned between the latch 602B of the storage element 602 of FIG. 6A and the latch 604A of the storage element 604. For example, if a falling edge transition of the local clock signal CLKA2 is late with respect to a corresponding rising edge transition of the local clock signal CLKB1, data arriving at the latch 604A could potentially sneak through the storage element 604. This situation is commonly referred to as a hold time problem.

Figure 7:
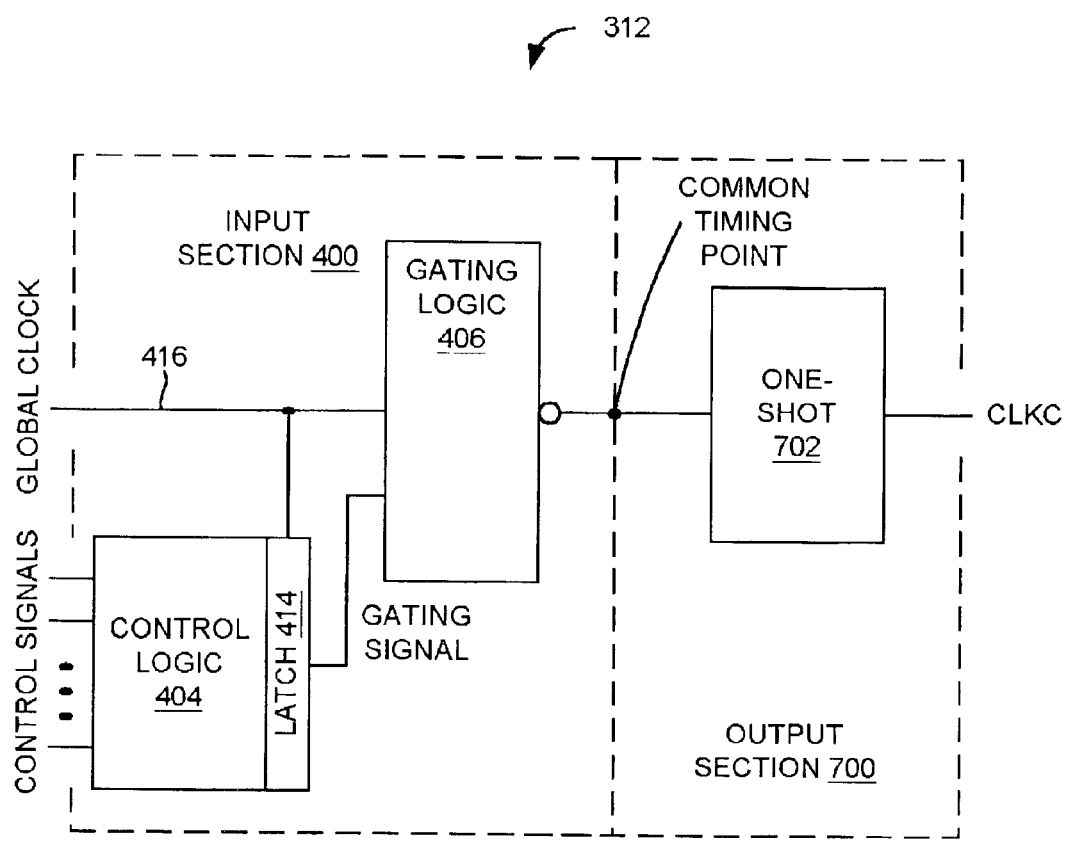
FIG. 7 is a diagram of one embodiment of another representative one of the local clock buffers (LCBs) of FIG. 3.

FIG. 7 is a diagram of one embodiment of a representative one of the local clock buffers (LCBs) 312 of FIG. 3. In the embodiment of FIG. 7, the representative local clock buffer (LCB) 312 includes the input section 400 described above and an output section 700. The output section 700 includes a one-shot 702. The one-shot 702 receives the intermediate clock signal produced by the gating logic 406 of the input section 400, and produces the local clock signal CLKC. In general, each time the output produced by the inverter 408 transitions from low to high (or from high to low), the one-shot 702 produces a pulse (either a positive pulse or a negative pulse) having a substantially fixed width as the local clock signal CLKC. In one embodiment, when the intermediate clock signal transitions from high to low, the one-shot 702 produces a positive pulse having a substantially fixed width as the local clock signal CLKC.

For example, where the representative local clock buffer (LCB) 312 represents the local clock buffer (LCB) 312A of FIG. 3, the one-shot 702 produces the local clock signal CLKC1. On the other hand, where the representative local clock buffer (LCB) 312 represents the local clock buffer (LCB) 312B of FIG. 3, the one-shot 702 produces the local clock signal CLKC2.

Figure 8:
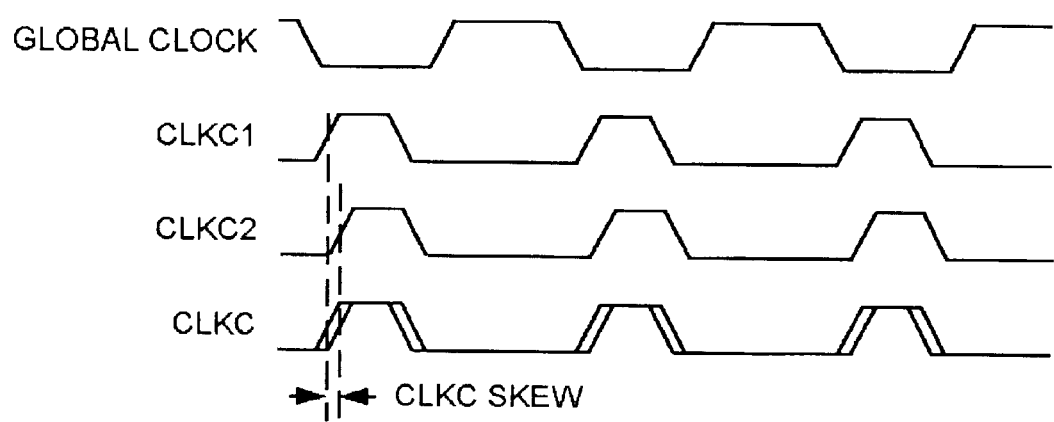
FIG. 8 is a timing diagram illustrating timing relationships between the local clock signals generated by similar local clock buffers (LCBs) of FIG. 3.

FIG. 8 is a timing diagram illustrating timing relationships between the local clock signals generated by the local clock buffers (LCBs) 312A and 312B of FIG. 3. As indicated in FIG. 8, a timing difference between the local clock signal CLKC1 generated by the local clock buffer (LCB) 312A and the local clock signal CLKC2 generated by the local clock buffer (LCB) 312B represents a "skew" of the local clock signal CLKC. However, as both the input sections 400 and the output sections 700 of the local clock buffers (LCBs) 312A and 312B of FIG. 3 are substantially identical, the skew of the local clock signal CLKC produced by the local clock buffers (LCBs) 312A and 312B is expectedly substantially reduced over a skew of a similar local clock signal produced by local clock buffers with different structures and internal time delays.

In general, use of the substantially identical local clock buffers (LCBs) 312A and 312B to produce the local clock signal CLKC allows the lower bound of the period of the GLOBAL CLOCK signal to be reduced, thereby increasing the upper bound of the maximum performance of the logic circuitry of the electronic circuitry 302 of FIG. 3.

It is also noted that as all of the local clock buffers (LCBs) 310A, 310B, 312A, and 312B of FIG. 3 have the substantially identical input sections 400, timing delays in deriving all of the local clock signals CLKA, CLKB, and CLKC from the GLOBAL CLOCK signal are reduced. In general, all of the clock signals are used to synchronize the operations of various logic structures (e.g., gates, registers, and the like) of logic circuitry of the electronic circuitry 302, and an output of any given logic structure may be an input to any other logic structure. As a result, using local clock buffers (LCBs) having at least the substantially identical input sections 400 generally allows the lower bound of the period of the GLOBAL CLOCK signal to be reduced, thereby increasing the upper bound of the maximum performance of the logic circuitry of the electronic circuitry 302.

Figure 9A:
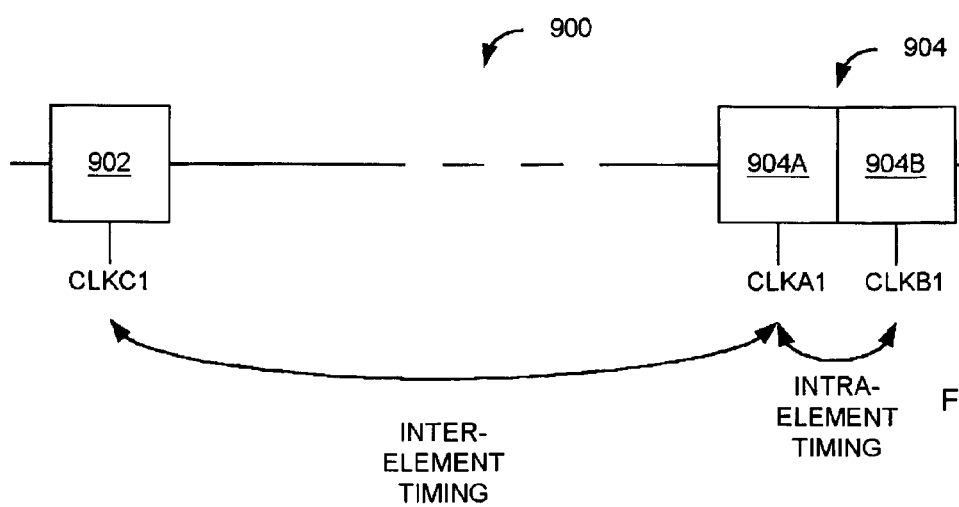
FIG. 9A is a diagram of a logic circuit wherein a storage element is coupled to receive a signal derived from an output of another storage element.

FIG. 9A is a diagram of a logic circuit 900 wherein a storage element 904 is coupled to receive a signal derived from an output of a storage element 902. The storage element 902 is a single latch (e.g., a "pulsed clock" latch). The pulse latch 902 passes an input data signal when the local clock signal CLKC1 is high, stores a value of the input data signal when the pulse clock signal transitions from high to low, and produces the stored value of the input data signal when the pulse clock signal is low.

The storage element 904 includes a pair of latches, and may be, for example, master slave flip-flops. For the reasons stated above, the first (master) latch 904A of the storage element 904 is designed to "capture" data in response to falling edges of the local clock signal CLKA1, and a second (slave) latch 904B is designed to "launch" the data in response to rising edges of the local clock signal CLKB1.

As indicated in FIG. 9A and described below, timing variations in the local clock signal CLKC1 and the local clock signal CLKA1 affect inter-element timing. In addition, timing variations in the local clock signal CLKA1 and the corresponding clock signal CLKB1 affect intra-element timing as described above.

Figure 9B:
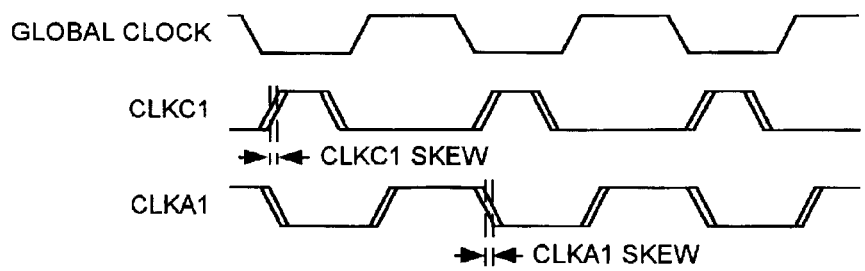
FIG. 9B is a timing diagram illustrating how variations in local clock signals affect inter-element timing of FIG. 9A.

FIG. 9B is a timing diagram illustrating how variations in the local clock signal CLKC1 and the local clock signal CLKA1 affect the inter-element timing of FIG. 9A. As indicated in FIG. 9B, a "CLKC1–CLKA1 skew" affecting the inter-element timing is equal to the sum of a timing variation or skew in the local clock signal CLKC1 and a timing variation or skew in the local clock signal CLKA1.

Figure 10:
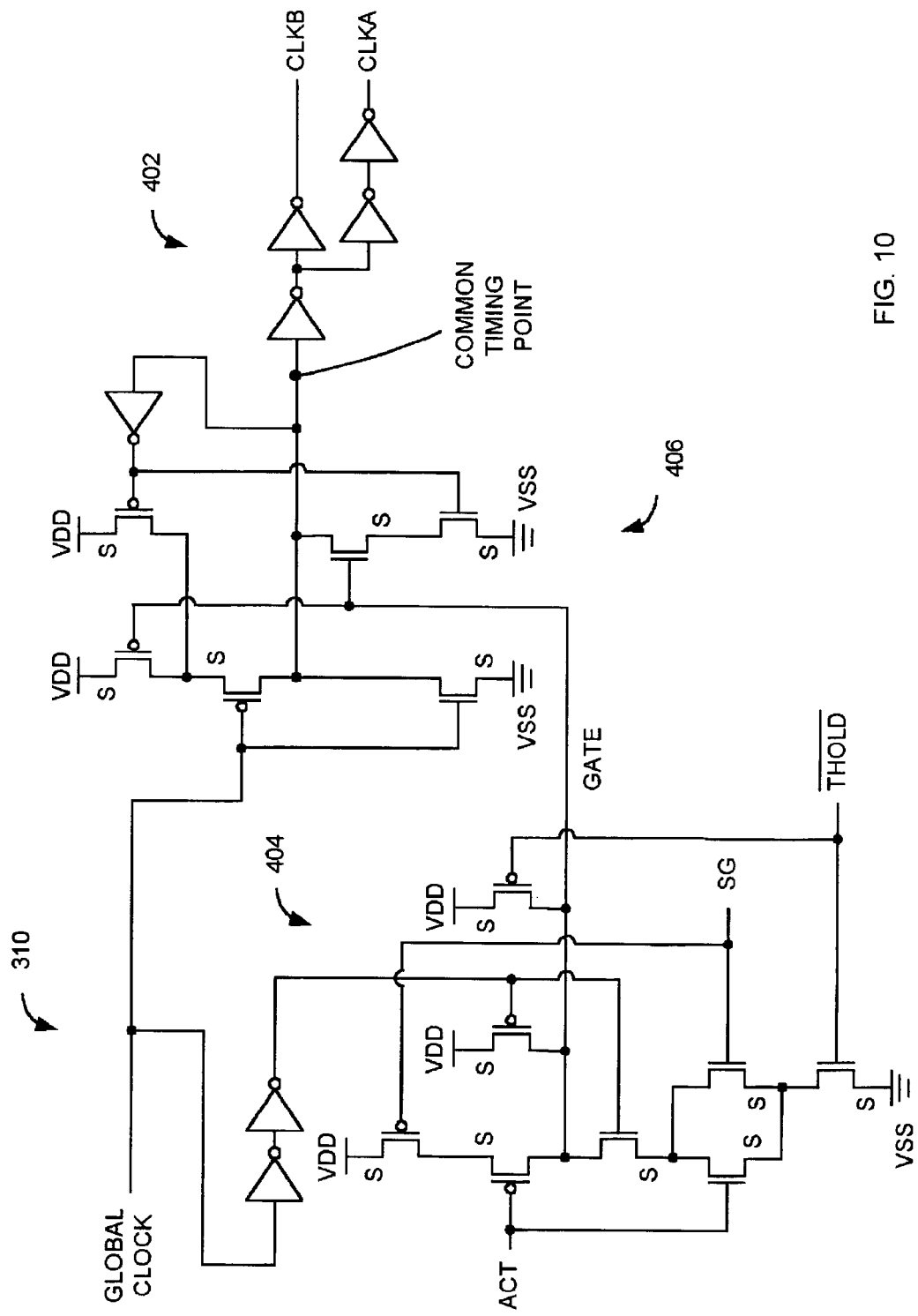
FIG. 10 is a diagram of one embodiment of the representative local clock buffer (LCB) of FIG. 4A.

FIG. 10 is a diagram of one embodiment of the representative local clock buffer (LCB) 310 of FIG. 4. In the embodiment of FIG. 10, the control logic 404 receives an "ACTIVATION (ACT)" signal, a "SCAN GATE (SG)" signal, and an inverted "TEST HOLD (THOLD)" signal, THOLD'. In one embodiment, the ACT signal is a logic '1' when the local clock signals CLKA and CLKB are to be derived from the GLOBAL CLOCK signal, and is a logic '0' when the GLOBAL CLOCK signal is to be "gated off" by the gating logic 406. The SG signal is a logic '1' during a scan testing mode, and a logic '0' during a normal functional mode. The THOLD' signal is a logic '0' when a stored value is to be held during the scan testing mode, and a logic '1' otherwise.

Figure 11:
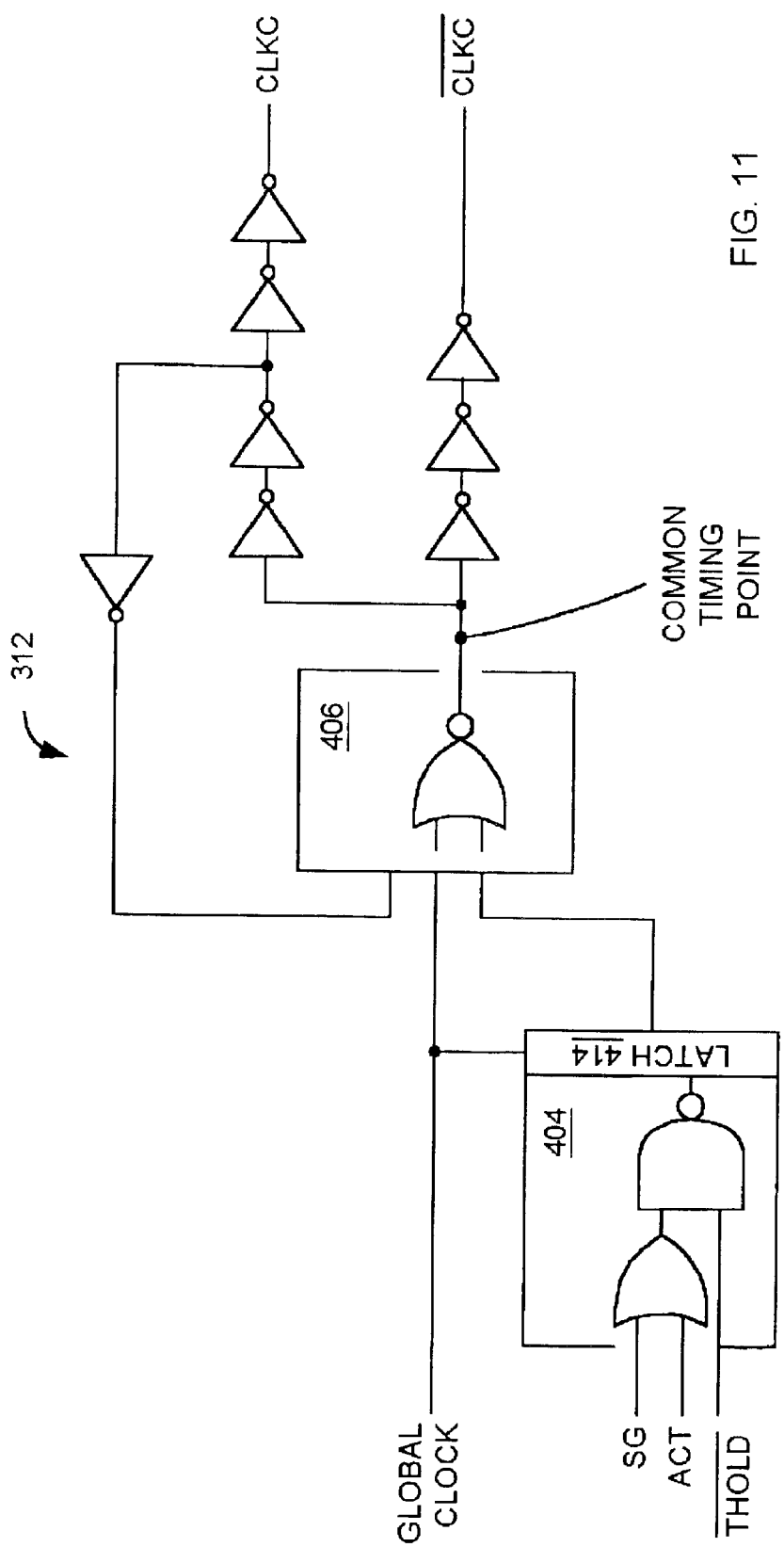
FIG. 11 is a diagram of one embodiment of the representative local clock buffer (LCB) of FIG. 7.

FIG. 11 is a diagram of one embodiment of the representative local clock buffer (LCB) 312 of FIG. 7. In the embodiment of FIG. 11, feedback logic and the gating logic 406 cooperate to perform the functions of the single shot 702 of FIG. 7.

Some of the local clock signals produced by the local clock buffers (LCBs) 310A, 310B, 312A, and 312B of FIG. 3 may be used in a normal or functional mode, and others may be used in a scan test mode (i.e., a scan mode). As the clock signals used in the functional and scan modes are generated using the same local clock buffer (LCB) structures, switching between the functional mode and the scan mode can be accomplished quickly (i.e., without "dead cycles"), and scan testing in the scan mode can be carried out "at speed."

The local clock signal generation system 308 of FIG. 3 including the local clock buffers (LCBs) 310A, 310B, 312A, and 312B at least substantially identical input sections supports several different types of latches to achieve optimal power/delay characteristics for different applications. For example, the above described clocking scheme supports master/slave latches (both scannable and non-scannable), dynamic latches, and pulsed clock latches. Should we mention again, that it is key that every critical timing edge in the clocking scheme is derived from falling GLOBAL CLOCK, independent from the type of latch.

The skews of the local clock signals produced by the local clock buffers (LCBs) 310A, 310B, 312A, and 312B of FIG. 3 may be further minimized by minimizing latencies of the input section 400 of FIGS. 4A and 7, and the output sections 402 of FIG. 4A and 700 of FIG. 7. A library of "standard" input and output sections may be developed having reduced latency variations due to manufacturing variations, temperature, and the like.

In FIGS. 4A and 7, frequency division of the local clock signals produced by the local clock buffers (LCBs) 310A, 31DB, 312A, and 312B of FIG. 3 can be accomplished by simply alternately asserting and deasserting (i.e., toggling) one or more control signals. For example, in FIG. 7, frequency division of the local clock signal CLKC produced by the local clock buffer (LCB) 312 can be accomplished by simply alternately asserting and deasserting (i.e., toggling) the THOLD' signal. While the THOLD' signal is being toggled, functional clock gating can be effected via the ACT signal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A local clock signal generation system, comprising:
   a plurality of local clock buffers each receiving a global clock signal and producing a version of at least one local clock signal derived from the global clock signal; and
   wherein each of the local clock buffers comprises an input section and an output section, and wherein the input sections of the local clock buffers are substantially identical such that timing differences between the versions of the at least one local clock signal are reduced; and
   wherein the input section comprises:
      control logic that is at least configured to receive the global clock signal and a plurality of control signals and to produce a gating signal dependent upon the control signals; and
      gating logic that is at least configured to receive the global clock signal and the gating signal and to produce a clock signal dependent upon the gating signal.

2. The local clock signal generation system as recited in claim 1, wherein each of the local clock buffers comprises a common timing point located between the input section and the output section and produces an intermediate clock signal at the common timing point, and wherein the intermediate clock signals at all the common timing points are substantially identical.

3. The local clock signal generation system as recited in claim 2, wherein a time difference exists between each of the intermediate clock signals and the global clock signal, and wherein all the time differences are substantially identical.

4. The local clock signal generation system as recited in claim 1, wherein a first portion of the local clock buffers produce versions of a first set of local clock signals, and wherein both the input sections and the output sections of the first portion of the local clock buffers are substantially identical such that timing differences between the versions of the first set of local clock signals are reduced.

5. The local clock signal generation system as recited in claim 4, wherein a second portion of the local clock buffers produce versions of a second set of local clock signals, and wherein the input sections of the first and second portions of the local clock buffers are substantially identical such that timing differences between the versions of the first and second sets of local clock signals are reduced.

6. The local clock signal generation system as recited in claim 2, wherein the output section of at least a portion of the local clock buffers comprises a pair of inverters receiving the intermediate clock signal and producing a version of a local clock signal.

7. The local clock signal generation system as recited in claim 2, wherein at least a portion of the local clock buffers perform a one-shot function upon the intermediate clock signal, thereby producing a local clock signal.

8. A local clock signal generation system comprising:
   a plurality of local clock buffers each receiving a global clock signal and producing a version of at least one local clock signal derived from the global clock signal;
   wherein each of the local clock buffers comprises an input section and an output section, and wherein the input sections of the local clock buffers are substantially identical such that timing differences between the versions of the at least one local clock signals are reduced; and
   wherein the input section of each of the local clock buffers comprises:
      control logic coupled to receive a plurality of control signals and the global clock signal, and configured to produce a gating signal dependent upon the control signals and the global clock signal; and
      gating logic coupled to receive the global clock signal and the gating signal, and configured to produce an intermediate clock signal dependent upon the global clock signal and the gating signal.

9. The local clock signal generation system as recited in claim 8, wherein in the event the gating signal is active, the intermediate clock signal is a version of the global clock signal.

10. The local clock signal generation system as recited in claim 8, wherein the input section of each of the local clock buffers performs a latching function upon the gating signal in response to the global clock signal.

11. The local clock signal generation system as recited in claim 8, wherein the control logic is configured to produce the gating signal during one cycle of the global clock signal, and wherein the gating logic is configured to produce the intermediate clock signal dependent upon the global clock signal and the gating signal during a subsequent cycle of the global clock signal.

12. The local clock signal generation system as recited in claim 8, wherein the gating logic performs a logic inversion at an output.

13. The local clock signal generation system as recited in claim 8, wherein the gating logic comprises a single logic gate.

14. The local clock signal generation system as recited in claim 8, wherein the gating logic comprises a single NOR logic gate receiving the global clock signal and the gating signal at inputs and producing the intermediate clock signal at an output.

15. The local clock signal generation system as recited in claim 8, wherein in the event the gating signal is a logic '0', the gating logic produces a time-delayed and inverted version of the global clock signal as the intermediate clock signal.

16. The local clock signal generation system as recited in claim 8, wherein in the event the gating signal is a logic '1', the gating logic produces a steady logic value as the intermediate clock signal.

17. An electronic circuit, comprising:
   a local clock signal generation system, comprising:
      a plurality of local clock buffers each receiving a global clock signal and producing a version of at least one local clock signal derived from the global clock signal;
      wherein each of the local clock buffers comprises an input section and an output section, and wherein the input sections of the local clock buffers are substantially identical such that timing differences between the versions of the at least one local clock signal are reduced;

wherein at least one of the local clock buffers contains an input section that comprises:
    control logic that is at least configured to receive the global clock signal and a plurality of control signals and to produce a gating signal dependent upon the control signals; and
    gating logic that is at least configured to receive the global clock signal and the gating signal and to produce a clock signal dependent upon the gating signal; and
a latch coupled to receive the first local clock signal at a control input and a data signal at a data input, and configured to produce the data signal as an output signal in the event the first local clock signal is high, to store a value of the data signal in the event the first local clock signal transitions from high to low and to produce the stored value as the output signal in the event the first local clock signal is low.

18. The electronic circuit as recited in claim 17, wherein the local clock buffer producing the first local clock signal receives a plurality of control signals and produces a gating signal dependent upon the control signals, and wherein in the event the gating signal is a logic '0', the first local clock signal is a time-delayed and inverted version of the global clock signal, and wherein in the event the gating signal is a logic '1', the first local clock signal is a steady logic '1'.

19. The electronic circuit as recited in claim 18, wherein the latch is a master latch of a master-slave flip-flop.

20. An integrated circuit comprising the electronic circuit of claim 17.

* * * * *